United States Patent [19]
Johnson et al.

[11] Patent Number: 5,330,734
[45] Date of Patent: Jul. 19, 1994

[54] SILICA PILLARED MICAS

[75] Inventors: Jack W. Johnson, Clinton; John F. Brody, Bound Brook, both of N.J.

[73] Assignee: Exxon Research and Engineering Company, Florham Park, N.J.

[21] Appl. No.: 28,485

[22] Filed: Mar. 9, 1993

[51] Int. Cl.$^5$ ................. C01B 33/26; B01J 20/12; B01J 21/16

[52] U.S. Cl. ................. 423/328.3; 502/63; 502/80

[58] Field of Search ............. 502/63, 80; 423/328.3

[56] References Cited

U.S. PATENT DOCUMENTS

| | | | |
|---|---|---|---|
| 4,367,163 | 1/1983 | Pinnavaia et al. | 252/455 R |
| 4,469,813 | 9/1984 | Gaaf et al. | 502/263 |
| 4,510,257 | 4/1985 | Lewis et al. | 502/84 |
| 4,515,901 | 5/1985 | Elattar | 502/63 |
| 4,757,040 | 7/1988 | Guan et al. | 502/63 |
| 5,063,039 | 11/1991 | Valyocsik | 423/339 |
| 5,068,216 | 11/1991 | Johnson et al. | 502/241 |

FOREIGN PATENT DOCUMENTS 0341023 11/1989 European Pat. Off. .

OTHER PUBLICATIONS

Intercalation and Pillaring of Zirconium Bis (monohydrogenphosphate) with $NH_2(CH_2)_3Si(OC_2H_5)_3$, Liansheng Li, Liu, Ge, Liyun Li, and Klinowski, J. Phys. Chem. 1991, 95, 5910–5914.

Studies on Structures of Cross-Linking Beidellites, L. Li, L. Li et al., Acta Petrolei Sinica (Petroleum Processing Section), 8 #1:59–65 (1992).

*Primary Examiner*—Carl F. Dees
*Attorney, Agent, or Firm*—E. C. Bakun

[57] ABSTRACT

Microporous materials of low acidity useful as sorbents and catalytic supports have been produced by pillaring tetrasilicic mica with silica polyoxocations generated by hydrolysis of organosilane precursors. Calcination at an intermediate temperature followed by washing of the solid with water is important in producing highly microporous material.

10 Claims, No Drawings

SILICA PILLARED MICAS

BACKGROUND

Oxide-pillared clays are well known as microporous materials that can serve as catalysts and catalyst supports for a variety of hydrocarbon reactions. By varying the composition of either the oxide pillars or the clay layers, new materials with desired properties can be produced. A useful material would be a pillared clay with little or no acidity that could be used as a sorbent or as a support for noble metal catalysts. Applicants have produced such a pillared clay. As used herein clays are intended to include micas.

Additionally, applicants' method of preparing the pillared clay of the instant invention significantly increases its surface area and microporosity, making the materials more desirable for use as catalysts, catalyst supports, and sorbents.

SUMMARY OF THE INVENTION

The present invention relates to silica-pillared mica compositions and a method for producing them. The method of producing a silica-pillared mica comprises the steps of:
  (a) contacting a fluoromica having layers therein with a material selected from the group consisting of organosilicon oligomer precursors and organosilicon oligomers for a time and at a temperature sufficient to allow said material to intercalate between said layers of said fluoromica;
  (b) calcining said fluoromica having said material diffused therein for a time and at a temperature sufficient to decompose said material into a silica pillar and to form an intermediate pillared mica product;
  (c) washing said calcined intermediate pillared mica product;
  (d) recalcining said washed and calcined intermediate pillared mica product for a time and at a temperature sufficient to form a silica pillared mica.

The invention is further directed to a silica pillared fluoromica comprising silica pillars intercalated between the layers of a synthetic fluoromica wherein said silica pillars are formed from materials selected from the group consisting of organosilicon oligomer precursors and organosilicon oligomers having a polyhedral silicon-oxygen skeleton bearing organic substituents attached to said silicon of said silicon-oxygen skeleton and wherein said organic substituents have been removed from said silicon-oxygen skeleton. The silica-pillared mica prepared from sodium tetrasilicic fluoromica in accordance with the present invention has a silica content of at least about 30 wt% as Si; a BET surface area of more than 50 m$^2$/g, preferably between 200 and 400 m$^2$/g; and an average layer repeat distance measured by X-ray diffraction of between 16 and 20 Angstroms. Decompose as used herein means that the pillaring material is wholly or partially converted into silica.

DETAILED DESCRIPTION

The silica-pillared micas of the present invention are prepared from synthetic fluoromicas such as sodium tetrasilicic mica (NaTSM) and synthetic taeniolite. Micas are formed of layers that may be visualized as sandwiches comprising two outer sheets of silicon tetrahedra and an inner sheet of aluminum octahedra (i.e. 2:1 layered mica). These micas can be represented by the general formula:

$$A_x[M_{2-3}T_4O_{10}(Y)_2]$$

where M designates the octahedral cation, T designates the tetrahedral cation, A designates the exchangeable interlayer cations, X is approximately equal to one (0.7-1), and Y is hydroxy (OH) or fluorine(F) either singly or in combination. The T ion is commonly $Si^{+4}$, $Al^{+3}$, or $Fe^{+3}$, but could also include several other four-coordinate ions, e.g., $P^{+5}$, $B^{+3}$, $Ga^{+3}$, $Cr^{+3}$, $Ge^{+4}$, $Be^{+2}$, etc. $Si^{+4}$ is preferred in this invention. The hexacoordinate M ion is typically $Al^{+3}$ or $Mg^{+2}$, but could also include many other possible hexacoordinate ions, e.g., $Fe^{+3}$, $Fe^{+2}$, $Ni^{+2}$, $Co^{+2}$, $Li^+$, $Cr^{+3}$, $V^{+2}$, etc. $Mg^{+2}$ is preferred in this invention.

Synthetic fluoromicas such as sodium tetrasilicic fluoromica ($Na[Mg_{2.5}Si_4O_{10}F_2]$) and lithium taenioite ($Li[(Mg_2Li)Si_4O_{10}F_2]$) undergo swelling in water and other suitable polar solvents such as ketones like acetone, methylethylketone, etc.; sulfoxides such as dimethylsulfoxide; formamides, such as dimethyl formamide and N-methyl formamide, and the like. Even though fluoromicas such as these exhibit high layer charge densities, with X in the above general formula approaching 1, they are capable of undergoing pillaring reactions with large polynuclear cations, for example, $Al_{13}O_4(OH)_{24}(H_2O)_{12}^{+7}$, $Zr_4(OH)_8(H_2O)_{16}^{+8}$, and the like. The resulting pillared tetrasilicic micas exhibit good thermal stability, increased surface area and are good sorbents and supports for catalytic reactions. See for example European Patent application 0240359 A2 to Johnson.

The process of producing the silica-pillared tetrasilicic micas begins by introducing an organosilicon oligomer which will give rise to a three dimensional supporting silica structure between the layers of the fluoromica. The mica is contacted with water or another polar solvent followed by addition of an organosilicon oligomer precursor or an organosilicon oligomer itself. Alternatively, solid mica may be added to a solution of an organosilicon oligomer precursor or a solution of an organosilicon oligomer itself. The mixture is then stirred and allowed to react. When an organosilicon oligomer precursor is utilized, it undergoes hydrolysis, in situ, to form the organosilicon oligomer which ultimately provides the pillars of the final pillared mica. Hence, the organosilicon oligomer can be referred to as the pillaring agent. Such in situ formation of the organosilicon oligomer from its precursor may occur prior to the precursor intercalating between the mica layers, or the precursor may first intercalate and then form the oligomer. Intercalate is a term of art which indicates the insertion of a material between the layers of a clay substrate. The temperature of reaction will depend on the organosilicon oligomer precursor or organosilicon oligomer selected and is readily determinable by one skilled in the art.

The organosilicon oligomer of the present invention is preferably prepared in situ by reacting, in solution, its precursor with the mica to be pillared. Frequently, the pH of the solution will be adjusted to provide for optimum intercalation. For example, when the pillaring agent or its precursor contains a positively charged group, the pH should be adjusted above 5 to minimize ion exchange of hydrogen ions in preference to the pillaring agent.

The precursor forming the organosilicon oligomer in situ or the organosilicon oligomer itself is contacted, in solution, with the mica selected, for a time and at a temperature sufficient to allow for intercalation. The precursor may be converted (hydrolyzed) into the organosilicon oligomer prior to intercalation, or it may intercalate prior to converting into the oligomer. NMR results show that the precursor is only partially hydrolyzed prior to subsequent calcination. The contacting can be performed at temperatures ranging from the freezing point to the boiling point of the solvent being utilized, or from the freezing point to the boiling point of the organosilicon oligomer or its precursor when they are in liquid form and acting as the solvent. For example, when 2-(2-trichlorosilylethyl)pyridine is used as the organosilicon oligomer precursor, the pH of solution is adjusted to above 5 and the mixture of mica and organosilicon oligomer precursor allowed to react at room temperature. When aminopropyltriethoxysilane, $NH_2(CH_2)_3Si(OEt)_3$, is used as the organosilicon oligomer precursor, the pH of the precursor solution is about 10 to 11 and no pH adjustment is necessary. However, the mica and precursor solution is refluxed since alkoxysilanes are less reactive towards hydrolysis than chlorosilanes. Temperatures higher than the boiling points of the solution or the organosilicon oligomer or its precursor may be utilized if adequate pressure containment is provided. Typically, the temperature should not exceed 200° C. above the boiling point. Reaction temperatures are readily determinable by one skilled in the art based on the particular organosilicon oligomer or organosilicon oligomer precursor chosen.

Contacting time can be anywhere from at least about 1 minute to about 1 month, preferably about 1 minute to 1 week, most preferably, about 1 to about 24 hours. The higher the contacting temperature the shorter the contacting time necessary. Such contacting times are readily determinable by one skilled in the art. The resulting material is then separated by any conventional means, washed and dried.

The organosilicon oligomers of the instant invention, may be prepared in situ by hydrolysis of an organosilicon oligomer precursor by contacting such precursor in solution with the fluoromica to be pillared. The pillaring agent used to prepare the pillared micas of the present invention is an organosilicon oligomer and may be prepared according to the procedure set forth in U.S. Pat. No. 4,510,257 to Lewis et al. herein, incorporated by reference and referred to as oligosilsesquioxanes and their homo derivatives.

The basic three dimensional silicate structure which makes up the silica pillars and the silica pillar precursors are described in the article by Voronkov et al, "Polyhedral Oligosilsesquioxanes and their Homo Derivatives," Topics in Current Chemistry, 102, pp 199-236, Springer-Verlag, 1982. These three dimensional silicate structures are known as polyhedral oligosilsesquioxanes. They are composed of a polyhedral silicon-oxygen skeleton which bears organic substituents attached to the silicon atoms. The molecules of these compounds have the general formula $(XSiO_{1.5})_n$ where n is an even number greater than or equal to 4, and X is organyl, lower alkyls, such as methyl, ethyl, propyl, butyl, hexyl, heptyl, etc; vinyl, allyl, benzyl, 2-methyl benzyl, 4-methyl benzyl, nitrobenzyl, etc., triethylammonium, aminopropyl, 2-pyridolethyl, etc. and the X may be the same or a mixture of the different substituents. These compounds may be considered as the products of complete hydrolytic condensation of the corresponding trifunctional monomers, $XSiY_3$ with Y=halogen, OH, OR, OCOR, etc.

A minor structural variation of the polyhedral silsesquioxanes are the homosilsesquioxanes. They differ from the above described oligosilsesquioxanes in that the Si—O bond of the latter is inserted by a XX'SiO group which is a homologous link in linear and cyclic oligo- and polysiloxanes. Homooligsilsesquioxanes are described by the general formula $(XSiO_{1.5})_n(OSiX_2)_m$, wherein m and n are integers and X is described as above. These compounds are the by-products of the synthesis of oligosilsesquioxanes and are usually found in minor amounts. Because of the close similarity in structure between the oligosilsesquioxanes and their homo derivatives, the term oligosilsesquioxane when used herein will include the polyhedral oligosilsesquioxanes as well as their homo derivatives. The pillar material can thus contain a mixture of polyhedral oligosilsesquioxanes and their homo derivatives.

The pillar materials used to prepare the compositions of the instant invention contain one or more compounds having the general formula $(ZSiO_{1.5})_n(OSiZ_2)_m$ where m and n are zero or an integer and m+n does not equal zero. In many cases, depending on preparative techniques, m will equal zero. Z is an organic moiety which serves as a coordinating and/or exchange group which allows the entire unit to be brought between the layers of the mica to be pillared. The organic moiety can be chosen such that it contains a coordinating group that is readily intercalated into the layered structure. Examples of coordinating structures include amines, amides, sulfoxides, glycols, alcohols and the like. Alternately, the organic moiety can be chosen such that it contains a cationic species that is readily exchanged into the layered structure. Examples of cationic species include ammonium ion, phosphonium ion, sulfonium ion, pyridium ion, and the like. Z may represent a single organic moiety or a mixture of organic moieties. It is however, easier to make pillared structures having identical Z's.

There are a number of routes to the synthesis of oligosilsesquloxane pillar materials. Voronkov et al. lists several procedures for the synthesis of the oligosilsesquioxane pillar materials and in general demonstrates the state of the art in the synthesis of the compounds. Illustrative, but nonexclusive reactions for forming the polyhedral silicon-oxygen skeleton of oligosilsesquioxanes are as follows:

1. Hydrolytic condensation of trifunctional monomers, $XSiY_3$ (with X=a chemically stable substituent and Y=a highly reactive substituent).
2. Condensation of Si-functional oligoorganylcyclosiloxanes, $[XYSiO]_m$ (e.g., $[C_2H_3SiHO]_{4.5}$).
3. Condensation of organosilicon monomers and/or oligomers of different structure and composition.
4. Thermolysis of polyorganyl silsesquioxanes.

In some cases, these reactions may be combined in order to obtain certain oligosilsesquioxanes or to increase the yield.

The preferred method of preparing the pillar materials starts with the hydrolytic condensation of the trifunctional monomers, $XSiY_3$. Hydrolytic polycondensation of trifunctional monomers of the type $XSiY_3$ leads to cross-linked three-dimensional as well as network and cissyndiotactic (ladder-type) polymers, $(XSiO_{1.5})_n$. With increasing amount of solvent, however, the corresponding condensed polycyclosiloxanes, polyhedral oligosiloxanes and their homo derivatives may be formed. The reaction rate, the degree of oligomerization and the yield of the polyhedral compounds formed strongly depend on the following factors:

1. Concentration of the initial monomer in the solution
2. Nature of solvent
3. Character of substituent X in the initial monomer
4. Nature of functional groups Y in the initial monomer
5. Type of catalyst
6. Temperature
7. Addition of water
8. Solubility of the polyhedral oligomers formed
9. pH Variations of the above factors have been studied in general and can be found in the literature, such as the aforementioned Voronkov et al. reference; otherwise, they can be determined by one skilled in the art through routine experimentation.

Oligosilsesquioxanes are formed in both polar and nonpolar solvents. Illustrative, but nonlimiting examples of solvents that have been found useful include benzene, toluene, cyclohexane, hexamethylsiloxane, acetone, ethyl ether, alcohols, such as methyl, ethyl, propyl and benzyl alcohol, ketones, organic acids, their anhydrides or esters, ketones, toluene, nitrobenzene, pyridine, ethylene glycol dimethyl ether, tetrahydrofuran, acetonitrile, diglyme, methyl isobutyl ketone.

Illustrative but nonlimiting examples of the substituent X in the initial monomer $XSiY_3$ include the lower alkyls, such as methyl, ethyl, propyl, butyl, hexyl, heptyl, etc; vinyl, allyl, benzyl, 2-methylbenzyl, 4-methylbenzyl, nitrobenzyl, etc., triethylammonium, aminopropyl, 2-pyridolethyl, and mixtures thereof.

Illustrative but nonlimiting examples of the substituent Y in the initial monomer $XSiY_3$ include, hydroxyl, halo such as chloro, bromo, iodo, alkoxy such as methoxy, ethoxy, acyloxy, and mixtures thereof.

Temperatures for the hydrolytic polycondensation of the monomer $XSiY_3$ are relatively low. Temperatures will vary depending on the monomer, solvent and other reaction conditions. Reported temperatures range from below 0° C. to 160° C.

The Z moiety in the oligosilsesquioxane pillar material $(ZSiO_{1.5})_n$ will be the X moiety of the monomer $XSiY_3$, i.e., pillar material $(ZSiO_{1.5})_n$=condensation product $(XSiO_{1.5})_n$ or the X of the condensation product $(XSiO_{1.5})_n$, can be modified or replaced by a different moiety through subsequent chemical reaction on $(XSiO_{1.5})_n$. Preferably all the Z's on a pillar material will be the same. However, it is possible, through special techniques such as the hydrolytic condensation of 2 or more monomers with different X's, to produce pillar precursors having different Z moieties. It is postulated that the size of the moiety Z is one of the factors that can affect the pore size distribution in the final calcined product. An increase in the bulk or size of the Z-moiety is expected to increase the interpillar distance, all other variables being held constant.

Hydrolyzable pillar precursors having groups capable of bearing a positive charge, such as amino groups, pyridyl groups, or phosphonium groups, rather than neutral precursors are preferred for preparing the silica oligomers. Preferably, an organosilicon oligomer prepared from 2-(2-trichlorosilylethyl) pyridine will be used. A more preferred organosilicon oligomer precursor is aminopropyltriethoxysilane, $NH_2(CH_2)_3Si(OEt)_3$.

The dried intercalated mica is calcined at an intermediate temperature for several hours, preferably about 1 to about 24 hours. This intermediate calcination temperature is sufficient to initiate the decomposition of the organosilicon oligomer to silica that forms the pillars of the intermediate pillared mica product. Intermediate pillared mica product as used herein means the pillared mica obtained following the first calcination of the process. Intermediate calcination temperature as used herein means a calcination temperature at which the first calcination of the process is conducted, which temperature is lower than the temperature of the final calcination by about 100° C. to about 300° C. Typically such intermediate calcination temperature will range from about 200° C. to about 600° C. Preferably, the intermediate calcination will be a staged calcination conducted at 400°–450° C. for at least about 1 hour, with lower temperatures possible throughout the remainder of the calcination step. Staged calcination means that the calcination temperature is gradually increased till the highest temperature desired is reached. The staged calcination need not be a linear increase, but can be increased for example from 200° to 400° C. and held at 400° C. followed by another increase etc. However, linear increases in temperature are effective.

After the intermediate calcination, the resultant material is washed with water or another suitable polar solvent, such as acetone, dimethyl formamide, dimethyl sulfoxide, N-methyl formamide, propylene carbonate, methanol, etc. The conditions of wash treatment must be sufficient to result in high surface area pillared mica after final calcination. When the wash step is performed with water at ambient temperature, periods of 1 to 5 days are sufficient, with 3–5 days preferred. By raising the temperature of the wash step to temperatures from 30° to 100° C., the duration of the wash step can be shortened.

After the intermediate calcination, followed by washing, the resultant material is recalcined to the second or final calcination temperature. This second calcination temperature must be sufficient to complete conversion of the organosilicon oligomer of the intermediate pillared product to a silica pillared mica. Typically, the second calcination will be run at temperatures ranging from about 400° C. to about 800° C. Again, the calcination temperature will preferably be staged and held at about 400° C. for about 1 hour and will ultimately be increased to about 600° C. for at least about 1 hour during the calcination procedure. It is important that the intermediate, or first, calcination step be conducted at a lower temperature than the final, or second calcination step to afford a product with increased surface area. By including a washing step followed by a second calcination after calcination at an intermediate temperature, applicants have found that the surface area of the pillared mica product is increased by as much as an order of magnitude. Typically the difference between the highest temperature of the intermediate calcination and the highest temperature of the final calcination will be at least about 100° C. The final calcination is conducted for several hours, preferably about 1 to about 24 hours.

The following examples are illustrative and not limiting in any way.

EXAMPLE 1.

Preparation of silica-pillared tetrasilicic mica (Si-TSM) using 2-(2-trichlorosilylethyl)pyridine.

500 grams of sodium tetrasilicic mica (NaTSM) obtained from Showa Sangyo Co., LTD, were dispersed in 20 liters of deionized water by mixing five batches of 100 grams of said mica in 4 liters of water and blending each batch for 4 minutes at room temperature. Each batch of the blended mica mix was then decanted into a glass reaction vessel. The pH of the mica mix was adjusted to 5.0 as it was stirred. The mixture was allowed to settle for 1 hour at room temperature. The mica mix was then spray dried at an inlet temperature of 230°–250° C., an outlet temperature of 120°–135° C., and a feed rate of 4–5 liters per hour. The resulting mica is referred to as purified NaTSM. A solution of oligosilsesquioxane was prepared by dissolving 24 g 2(2-trichlorosilylethyl)pyridine in 175 mL of anhydrous methanol. 10.5 mL of water was added dropwise, the solution was cooled with an ice/water bath and allowed to stir for 1 hr. 5 g of the purified sodium tetrasilicic mica (NaTSM) was dispersed in 300 mL distilled water and 24.7 mL of the organosilsesquioxane solution. The mixture immediately became viscous and gelled. Shaking the flask vigorously and adding an additional ~20mL of water broke the gel and allowed the mixture to be stirred. The pH of the suspension was adjusted to 6 with concentrated ammonia and the mixture was stirred at ambient temperature for 2 hours. The solid was separated by centrifugation and washed six times with 1 L portions of distilled water. The solid was dried in an oven at 120° C. A portion of the material was calcined by raising the temperature of the furnace from 200° C. to 600° C. at 100° C per hour. The X-ray diffraction pattern of the Si-TSM produced by this procedure showed a low-angle diffraction peak corresponding to a layer spacing of 16.3 Angstroms, and the surface area was 44 $m^2/g$.

EXAMPLE 2.

Preparation of silica-pillared tetrasilicic mica (Si-TSM) using 2-(2-trichlorosilylethyl)pyridine including an intermediate wash step The remainder of the material from example 1 above, that had been dried in an oven at 120° C., was calcined at 200° C. for 2 hours, and at 400° C. for 2 hours. The dark brown sample was washed by stirring in distilled water for 4 days followed by drying at 120° C. and calcining at 200° C. for 2 hours, at 400° C. for 2 hours, and at 600° C. for 2 hours. The X-ray diffraction pattern of the grey Si-TSM produced by this procedure showed a low-angle diffraction peak corresponding to a layer spacing of 16.9 Angstroms and a surface area of 192 $m^2/g$.

The results show a significant increase in the surface area of the Si-TSM by including an intermediate calcination step and an additional wash step before final calcination.

EXAMPLE 3.

Preparation of silica-pillared tetrasilicic mica using $NH_2(CH_2)_3Si(OEt)_3$ 12 ml $NH_2(CH_2)_3Si(OEt)_3$ was diluted with 200 mL distilled water and 5 g NaTSM (purified by pH adjustment, sedimentation, and spray drying) was added. The mixture was refluxed while stirring for 4 days. The solid was separated by centrifugation and washed four times with 1 L portions of distilled water. The solid was dried in an oven at 120° C. The surface area of the sample at this point after outgassing at 200° C. was 17 $m^2/g$, and X-ray diffraction showed a layer spacing of 21.5 Angstroms. A portion of the material was calcined at 200° C. for 2 hours, at 400° C. for 2, and at 600° C. for 2 hours. The X-ray diffraction pattern of the Si-TSM produced showed a low-angle diffraction peak corresponding to a layer spacing of 16.8 Angstroms. The surface area was 31 $m^2/g$.

EXAMPLE 4.

Preparation of silica-pillared tetrasilicic mica using $NH_2(CH_2)_3Si(OEt)_3$ using an intermediate wash step The remainder of the material from example 3 above that had been dried in an oven at 120° C. and was calcined at 200° C. for 2 hours and 400° C. for 2 hours was washed by stirring in distilled water for five days, dried at 120° C. and calcined at 200° C. for 2 hours, at 400° C. for 2, and at 600° C. for 2 hours. The X-ray diffraction pattern of the white Si-TSM produced showed a low-angle peak corresponding to a layer spacing of 17.5 Angstroms and a surface area of 315 $m^2/g$.

EXAMPLE 5.

Preparation of silica-pillared tetrasilicic mica using $NH_2(CH_2)_3Si(OEt)_3$ and a post calcination wash step A portion of material from example 3 above that had been calcined at 600 °C., was washed by stirring for 4 days in distilled water, dried at 120° C., and calcined at 200° C. for 2 hours, at 400° C. for 2 hours, and at 600° C. for 2 hours. The X-ray diffraction pattern of the white Si-TSM produced showed a low-angle peak corresponding to a layer spacing of 16.7 Angstroms and a surface area of only 62 $m^2/g$.

The results show the importance of washing the sample after calcination at an intermediate temperature to develop high surface area. When the intermediate calcination temperature is the same as that of the final calcination temperature only a slight increase in surface area is observed.

TABLE 1

| Oligomer Precursor | Intermediate Calcination °C. | Final Calcination °C. | Surface Area $m^2/g$ |
| --- | --- | --- | --- |
| 2-(2-trichloro silylethyl)pyridine | none | 600 | 44 |
| 2-(2-trichloro silylethyl)pyridine | 400 | 600 | 192 |
| $NH_2(CH_2)_3Si(OEt)_3$ | none | 600 | 31 |
| $NH_2(CH_2)_3Si(OEt)_3$ | 400 | 600 | 315 |
| $NH_2(CH_2)_3Si(OEt)_3$ | 600 | 600 | 62 |

All samples showing a final calcination step additionally underwent washing after intermediate calcination. Samples showing no final calcination step were merely calcined without additional washing or calcination.

The data indicate that an intermediate temperature calcination, followed by washing and final calcination, dramatically increases the surface area of the silica pilared TSM.

EXAMPLE 6

The effect of varying the temperature of the intermediate calcination step and the time of the intermediate wash step was investigated by preparing a series of silica-pillared tetrasilicic micas according to the general procedure of Example 4 in which the temperature of the intermediate calcination was varied from 300° to 500° C. and the time of the intermediate wash step was either one or three days. All samples underwent a final staged calcination to 600° C. All samples had layer repeat distances of 17.0 to 17.6 Å as measured by X-ray powder diffraction. The surface areas varied as shown in Table 2.

TABLE 2

| Sample | Intermediate Calcination Temperature (°C.) | Wash Time (Days) | Surface Area (m²/g) |
| --- | --- | --- | --- |
| 6a | 300 | 1 | 165 |
| 6b | 350 | 1 | 169 |
| 6c | 400 | 1 | 162 |
| 6d | 450 | 1 | 218 |
| 6e | 500 | 1 | 97 |
| 6f | 300 | 3 | 183 |
| 6g | 350 | 3 | 237 |
| 6h | 400 | 3 | 220 |
| 6i | 450 | 3 | 244 |
| 6j | 500 | 3 | 89 |
| 5 | 600 | 3 | 62 |

The data demonstrate that intermediate calcination temperatures of 350°–450° are preferred and that sufficient time is necessary for the intermediate wash step.

What is claimed is:

1. A method of producing a silica-pillared mica comprising the steps of:
   (a) contacting a fluoromica having layers with a material selected from the group consisting of organosilicon precursors and organosilicon oligomers for a time and at a temperature sufficient to allow said material to intercalate between said layers of said fluoromica;
   (b) calcining said fluoromica having said material diffused therein for a time and at a temperature sufficient to decompose said material into a silica pillar and to form an intermediate pillared mica product;
   (c) washing said calcined intermediate pillared mica product;
   (d) recalcining said washed and calcined intermediate pillared mica product for a time and at a temperature sufficient to form a silica pillared mica.

2. A method according to claim 1 wherein said calcination temperature of step (b) is about 200° C. to about 600° C.

3. A method according to claim 1 wherein said recalcination temperature of step (d) is about 400° C. to about 800° C.

4. A method according to claim 1 wherein when said material contains a positively charged group, the pH of said material is adjusted to above five.

5. A method according to claim 1 wherein said organosilicon oligomers are oligosilsesquioxanes having the general formula $(XSiO_{1.5})_n$ where n is an even number greater than or equal to 4 and X is selected from the group consisting of organyl, methyl, ethyl, propyl, butyl, hexyl, heptyl, vinyl, allyl, benzyl, 2-methylbenzyl, 4-methylbenzyl, nitrobenzyl, triethylammonium, aminopropyl, and 2-pyridolethyl and mixtures thereof.

6. A method according to claim 5 wherein said oligosilsesquioxanes includes homosilsesquioxanes having the general formula $(XSiO_{1.5})_n(OSiX_2)_m$ wherein m and n are integers and X is selected from the group consisting of organyl, methyl, ethyl, propyl, butyl, hexyl, heptyl, vinyl, allyl, benzyl, 2-methylbenzyl, 4-methylbenzyl, nitrobenzyl, triethylammonium, aminopropyl, and 2-pyridolethyl and mixtures thereof.

7. A method according to claim 1 wherein said organosilicon oligomer precursors have the general formula $XSiY_3$ wherein X is selected form the group consisting of methyl, ethyl, propyl, butyl, hexyl, heptyl, vinyl, allyl, benzyl, 2-methylbenzyl, 4-methylbenzyl, nitrobenzyl, triethylammonium, aminopropyl, and 2-pyridoethyl and mixtures thereof and wherein Y is selected from the group consisting of hydroxyl, halo, and alkoxy and mixtures thereof.

8. A method according to claim 1 wherein said fluoromica is selected from the group consisting of sodium tetrasilicic fluoromica and lithium taeniolite.

9. A method according to claim 1 wherein said silicon oligomer is prepared in situ.

10. A method according to claim 1 wherein said contacting of step (a) is at least about 1 minute.

* * * * *